US005344144A

United States Patent [19]

Canon

[11] Patent Number: 5,344,144

[45] Date of Patent: Sep. 6, 1994

[54] PROGRESSIVE JACKPOT GAMING SYSTEM WITH ENHANCED ACCUMULATOR

[75] Inventor: Joseph W. Canon, Las Vegas, Nev.

[73] Assignee: Mikohn, Inc., Las Vegas, Nev.

[21] Appl. No.: 589,428

[22] Filed: Sep. 27, 1990

[51] Int. Cl.[5] ........................ A63F 9/24; G07F 17/34; G06F 15/44

[52] U.S. Cl. ............................ 273/138 A; 273/143 R

[58] Field of Search ....................... 273/143 R, 138 A; 364/412

[56] References Cited

U.S. PATENT DOCUMENTS

| | | | |
|---|---|---|---|
| 4,216,461 | 8/1980 | Werth et al. | 273/143 R |
| 4,283,709 | 8/1981 | Lucero et al. | 340/825.08 |
| 4,335,809 | 6/1982 | Wain | 273/138 A |
| 4,357,605 | 11/1982 | Clements | 340/825.06 |
| 4,636,951 | 1/1987 | Harlick | 273/138 A |
| 4,652,998 | 3/1987 | Koza et al. | 273/138 A |
| 4,837,728 | 6/1989 | Barrie et al. | 273/143 R |
| 4,842,278 | 6/1989 | Markowicz | 273/138 A |
| 4,926,327 | 5/1990 | Sidley | 273/138 A |
| 4,964,638 | 10/1990 | Ishida | 273/143 R |

OTHER PUBLICATIONS

Barrie et al.; Program Listing for Progressive Controller; From Microfiche Appendix of—U.S. Pat. No. 4,837,728.

*Primary Examiner*—William H. Grieb
*Assistant Examiner*—Jessica J. Harrison
*Attorney, Agent, or Firm*—Robin, Blecker, Daley & Driscoll

[57] ABSTRACT

An accumulator for a multiple jackpot gaming system wherein the accumulator has the facility for date stamping jackpot-wins, recording the identification of devices and changes being made by such devices to its data and/or programming, allocating coins-in to one or more jackpot groups and/or to one or more increment rates assigned to a particular jackpot group, operate its jackpot stack so as to clear stack positions immediately upon clearing a jackpot, and control jackpot handling from its main programming loop.

40 Claims, 3 Drawing Sheets

Microfiche Appendix Included
(1 Microfiche, 35 Pages)

21

| JACKPOT HISTORY TABLE | | | | |
|---|---|---|---|---|
| JP AMOUNT | MACHINE ID | JP GROUP | TIME | DATE |

FIG. 2

31

| ACCUMULATOR HISTORY TABLE | | | |
|---|---|---|---|
| DEVICE ID | MESSAGE TYPE ID | TIME | DATE |

FIG. 3

| COIN-IN ALLOCATION SCHEDULE | | | | |
|---|---|---|---|---|
| COIN-IN SEQUENCE | JACKPOT A INCREMENTED | JACKPOT B INCREMENTED | INCREMENT RATE A | INCREMENT RATE B |
| 1 | YES | YES | X | Y |
| 2 | YES | YES | X | Y |
| 3 | YES | YES | X | Y |
| 4 | YES | YES | X' | Y |
| 5 | NO | YES | N/A | Y |
| 6 | NO | YES | N/A | Y' |

FIG. 4

| JACKPOT | MACHINE ID | JACKPOT AMOUNT |
|---|---|---|
| JA | 101 | $ |
| JA | 102 | $ |
| JB | 106 | $ |
| JA | 110 | $ |
| JB | 111 | $ |
| JA | 104 | $ |
| JB | 103 | $ |

3F

FIG. 5A

| JACKPOT | MACHINE ID | JACKPOT AMOUNT |
|---|---|---|
| JA | 101 | $ |
| JA | 102 | $ |
| | | |
| JA | 110 | $ |
| | | |
| JA | 104 | $ |
| JB | 103 | $ |

3F

MACHINES 106 AND 111 CLEAR

FIG. 5B

| JACKPOT | MACHINE ID | JACKPOT AMOUNT |
|---|---|---|
| JA | 101 | $ |
| JA | 102 | $ |
| JA | 110 | $ |
| JA | 104 | $ |
| JB | 103 | $ |
| | | |
| | | |

3F

STACK RESHUFFLED

FIG. 5C

PROGRESSIVE JACKPOT GAMING SYSTEM WITH ENHANCED ACCUMULATOR

REFERENCE TO MICROFICHE APPENDIX

A Microfiche Appendix having one microfiche and a total of 35 frames accompanies this Specification.

FIELD OF THE INVENTION

This invention relates to gaming systems and, in particular, to progressive jackpot gaming systems.

DESCRIPTION OF THE PRIOR ART

In progressive jackpot gaming systems, a program controlled accumulator accumulates an incrementally varying jackpot amount, based on a percentage of total game play by one or more players, playing on gaming devices that are interconnected with the accumulator. This incrementally varying jackpot amount is paid to a game player upon a game win. Generally, the gaming devices report coin-in and game-win information to the accumulator, which enable the accumulator to correspondingly generate the jackpot increments for transmission back to the gaming devices.

Early progressive gaming systems usually provided a single large progressive jackpot for the interconnected gaming devices, with 1–2 percent of each coin played added to the incrementally growing jackpot amount. With a single jackpot, the jackpot amount was generally large enough that gaming establishment personnel would be involved in paying the winning player. Also, these early gaming systems typically had a fixed starting or base amount and a fixed increment percentage for the single jackpot and these values could only be changed by an authorized technical representative physically changing the accumulator content, such as by changing its program code. Such a change was usually significant enough that it had to be made known to and authorized by senior levels of management within the gaming establishment.

These direct interactions with gaming establishment personnel at senior levels, provided a level of security for the progressive system. In particular, it resulted in jackpot information (e.g., when and for what amount a jackpot was hit) and accumulator access information (e.g., the identity of the personnel setting the jackpot amounts) from which an audit trail for monitoring the gaming system could be developed. Thus, the audit trail could be used to establish, amongst other things, whether a jackpot was false and whether the amount of a jackpot was correct (calculatable from the number of coins in times the increment percentage).

Because of infrequent payouts, however, players of these single jackpot progressive systems began to loose incentive and to play less frequently. This lead to modification of the progressive systems to provide for more jackpots or jackpot groups with smaller payouts so as to be more frequent in their hit rates, and, therefore, more attractive to players. In these multiple jackpot systems, the amount of a jackpot related to the probability that the jackpot would be hit. Accordingly, the jackpots varied from very large jackpots which hit infrequently (e.g., every couple of months) to small jackpots which hit very frequently (e.g., several times a day), all being progressive jackpots and growing in size as a percentage of the coins in.

Along with multiple jackpot groups, these progressive systems were further modified to permit the gaming establishment to externally program or set the system accumulator for the base jackpot amount and the jackpot increment rate. This added flexibility to the system and no longer required authorized technical representatives to physically change the accumulator. Furthermore, since many of the multiple jackpots were small, senior level gaming establishment personnel no longer became involved with jackpot payouts or jackpot settings. These changes in procedure, while dictated by the changes to the progressive systems, created new security problems, since jackpot payout and accumulator access information were no longer available for many jackpots.

Another problem with these multiple jackpot systems was that they still possessed a degree of inflexibility in the way jackpots were set for the different jackpot groups. Thus, in these systems, each coin-in was used to increment each jackpot group and the increment for a group for each coin remained the same. This limited the mechanisms which could be programmed into the systems to stimulate more game play.

Some types of multiple jackpot systems also experienced so-called "lock-up" which occurred when a large number of jackpots were hit over a relatively short span of time. Thus, as the progressive systems added more levels of jackpots and increased the number of gaming devices connected to a single jackpot, the hit frequency increased and resulted in situations where the entire progressive system "locked up", due to many jackpots awaiting completion of their payout.

This situation resulted from the use in the progressive system accumulator of a jackpot payout queue or stack which operated on a first-in first-out basis and which "locked-up" the entire progressive system when all stack positions storing payouts to be completed became filled. This occurred, even if a jackpot in the middle of the stack had been paid out, since its position in the stack could not be immediately cleared and made available to another jackpot. This caused the stack to "lock-up" the gaming system at a greater frequency than was desired.

Prior progressive systems also utilized programming in the system accumulator in which routines for collecting and manipulating coin-in and jackpot-win information were executed during timer interrupts and, thus, outside the main loop. Since collecting the information required scanning of input lines and since manipulating the information required calculation of jackpot values based upon new coin-in data, the interrupts for these activities had to be lengthy. As a result, the time allocated to main loop routines was necessarily required to be a small percentage of the overall time, causing non-interrupt routines to operate slowly. Also, modifications to the routines for jackpot mainipulation had to be placed in the interrupt based section of the programming. This made the interrupt timing a factor in the application running. Furthermore, since the timer interrupt was a function of the applications being run, the regularity of the jackpot scanning and manipulation was less than desired.

It is, therefore, an object of the present invention to provide a progressive jackpot gaming system which does not suffer from the above disadvantages.

SUMMARY OF THE INVENTION

In accordance with the principles of the present invention, the above and other objectives are realized in a progressive jackpot gaming system by suitable adaptation of system gaming devices and progressive accumulator. More particularly, in accord with the invention, the progressive accumulator is provided with a real time clock for use in identifying the time and day of reported jackpots. This information is stored in a jackpot history table with the amount, jackpot group and gaming machine associated with the hit jackpot. In this way, by accessing the jackpot history table, an audit trail of jackpots can be read out to verify jackpots and perform other auditing functions.

The accumulator of the invention is further adapted to be accessible for certain preselected types of changes to its programming and data through coded, identifiable reprogramming devices whose identification is recorded along with the functional change being made or attempted. This information is stored in an accumulator history table and enables those effecting changes and, in particular, programmed changes to the jackpot amounts, to be identified.

Furthermore, in order to permit greater flexibility in establishing jackpots, the accumulator and progressive system of the invention are further adapted to selectively associate coins-in with various different jackpots and to further selectively associate coins-in with different increments of a given jackpot.

Additionally, the accumulator of the invention is provided with a jackpot stack in which positions in the stack can be cleared or reset immediately upon clearing of the corresponding jackpot at the gaming machine. Upon reset or clearing of a stack position, the stack is reshuffled to fill cleared stack positions, thereby opening up lower positions for subsequently hit jackpots.

Finally, the accumulator of the invention is further adapted such that the programming routines for jackpot manipulation are all called from the main programming loop. This keeps the time spent in interrupt at a minimum.

DESCRIPTION OF THE DRAWINGS

The above and other features and aspects of the present invention will become more apparent upon reading the following detailed description in conjunction with the accompanying drawings, in which:

FIG. 2 shows a representative jackpot history table of the progressive accumulator of FIG. 1;

FIG. 3 shows a representative accumulator history table of the progressive accumulator of FIG. 1;

FIG. 4 shows representative processing of messages in the accumulator of FIG. 1 for identifying coins-in with different jackpot groups and with different increments within a given jackpot group; and FIGS. 5A, 5B and 5C show the jackpot stack or queue of the accumulator of FIG. 1 in various conditions.

DETAILED DESCRIPTION

Figure 1:
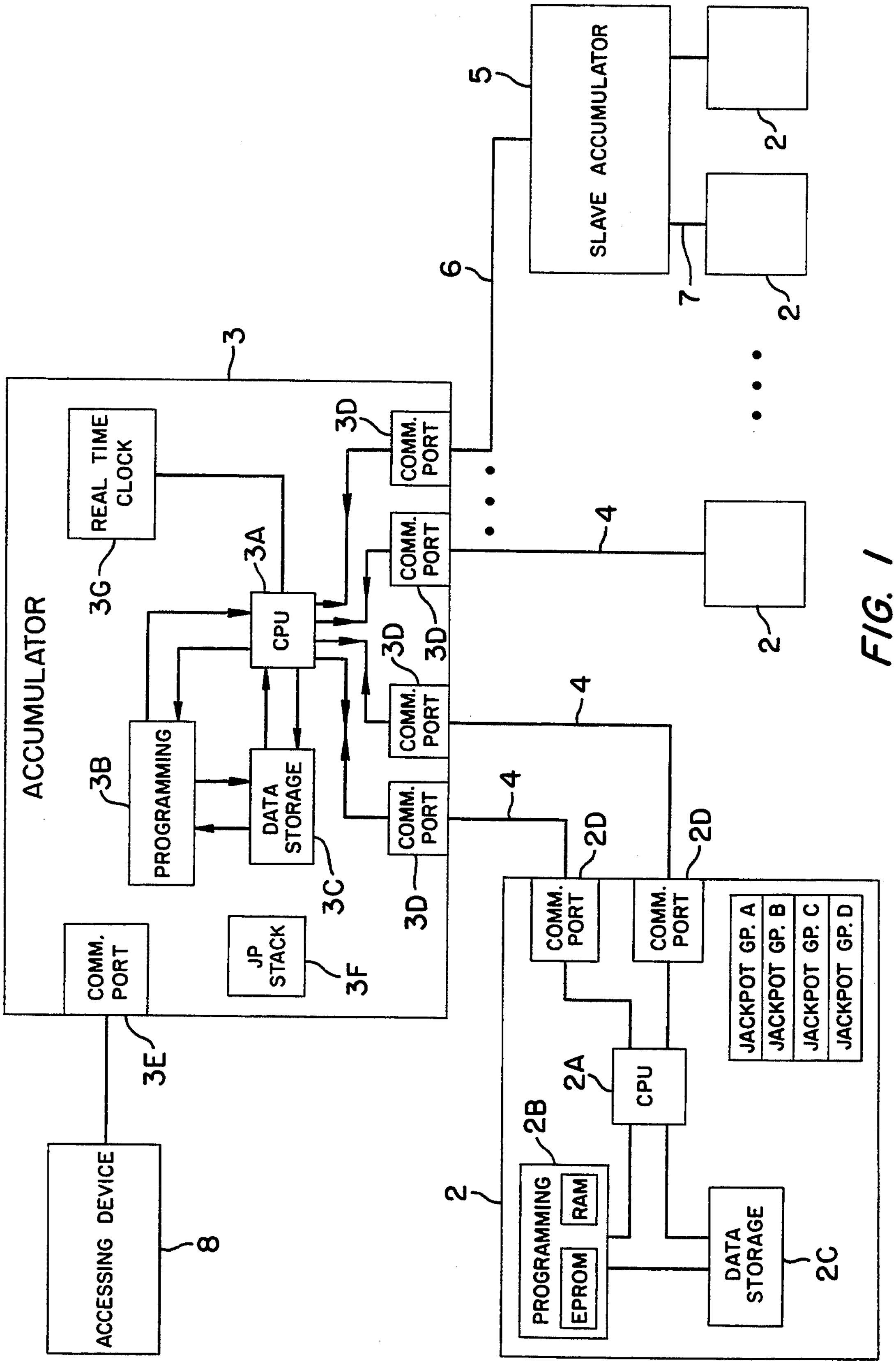
FIG. 1 shows a progressive jackpot gaming system employing a progressive accumulator in accordance with the principles of the present invention.

FIG. 1 shows a progressive multiple jackpot system 1 in accordance with the principles of the present invention. The system 1 comprises a plurality of gaming machines 2 each configured to provide multiple jackpot groups, identified schematically as groups A through D. The gaming machines 2 are programmable type machines each having a main CPU 2A, programming 2B and data storage 2C, which together function to control the respective machine. Each machine 2 also comprises one or more communication ports 2D which allow information to be transferred to and from the machine.

The CPU 2A, programming 2B and data storage 2C of each machine 2 can be formed by usual integrated circuits components. The programming 2B is shown as including both RAM and EPROM circuits.

Of the jackpot groups provided by the machines 2, a number are progressive jackpots. A progressive jackpot is one in which a common jackpot amount is established for associated jackpot groups (e.g., the like jackpot groups A) of the machines 2 and is controlled based upon the play at each of the machines.

In the present illustrative case, the like jackpot groups A of the machines 2 form a first progressive jackpot and the like jackpot groups B form a second progressive jackpot. The jackpot groups C and D, in turn, are regular jackpots and not progressive.

The jackpot values for the progressive jackpot groups A and B are determined based upon a corresponding jackpot base amount and a corresponding jackpot increment amount for each jackpot group. The jackpot increment amount is determined by multiplying a predetermined percentage increment for each jackpot, by the coins-in to the machines 2. Hence, the jackpot amounts JA and JB for the two progressive jackpot groups A and B can be expressed as follows:

$$JA = BA + x\,C_i$$

$$JB = BB + y\,C_i$$

where BA and BB are the respective base amounts for the groups A and B, x, y are the respective percentage increments and $C_i$ is the aggregate of the coins played on the machines 2.

As can be appreciated, the jackpot values JA and JB of the progressive jackpots A and B are continually incremented based on the coins played. As a result, each jackpot increases in value. This continues until a jackpot is hit or won on any one of the machines 2. At this time, a payout amount equal to the hit jackpot amount is held and stored for the machine 2 where the hit or win occurred and the player is paid the stored payout amount. Also at this time, the jackpot amount of the hit jackpot is returned to its base amount and again begins incrementing for the machines 2 until another win at which time the process is repeated.

In order to control the gaming machines 2 to provide the progressive jackpot function, as above-discussed, the system 1 is further provided with a progressive controller or accumulator 3. The progressive accumulator 3 is also a program controlled device and includes a CPU 3A, programming 3B and data storage 3C for jointly controlling its operation. The accumulator 3 also includes a number of communication ports 3D for communicating with the gaming machines 2.

As shown, the accumulator 3 communicates directly with a number of the gaming machines 2 via communication paths comprising links 4 and with the remaining devices over a communication path comprising slave accumulator 5 and links 6 and 7. The communication over these paths and through the communication ports can take on one or more of a variety of forms, including, for example, single and multiline pulse transmission, multiplexed pulse transmission, bidirectional pulse transmission and message or packet type pulse transmission.

The information transmitted from the accumulator 3 to the gaming devices 2 comprises, amongst other things, the jackpot values for the progressive jackpots calculated by the accumulator in accordance with the expressions JPA and JPB above. The information transmitted from the gaming devices to the accumulator 3, in turn, includes coin-in and jackpot-win information from which the jackpot values can be determined.

In the case of slave accumulator 5, the latter acts to accumulate the coin-in and jackpot-win information communicated over the links 7 from the machines 2 and then relay this information on to the accumulator 3 over links 6. Similarly, the jackpot value information is passed from the accumulator 3 over links 6 to the slave accumulator 5 and over the links 7 to the machines 2. The transmission between the machines 2 connected to the links 4 and the accumulator 3 is direct and, again, coin-in and jackpot-win information flows to the accumulator 3 from the gaming machines 2 and jackpot value information flows in the other direction from the accumulator to the machines.

The accumulator 3 is additionally adapted to allow for access to its programming 3B and data 3C via a further communication port 3E. This port allows for connection of the accumulator 3 to an accessing device 8 (which may be a hand held programmable unit). Communication with the device 8 may also take on one or more of the forms mentioned above.

In order to handle processing of the progressive jackpots, as above-described, the programming 3B includes a jackpot stack or queue 3F. This stack stores the hit jackpot payout amounts for particular machines whose jackpots have been hit and which are being held at the machines for payout and clearing. This allows the accumulator 3 to reset the jackpot values and continue operation with the other gaming machines or devices 2 for a particular jackpot, while the process of pay-out at a hit machine is being carried out.

As described to this point, the multiple progressive jackpot gaming system of FIG. 1 can be carried out by suitable conventionally available equipment. Typical of the gaming machines 2 might be slot machines manufactured by International Gaming Technology under Model No. I6T St and poker machines manufactured by International Gaming Technology under Model No. Players Edge+. Likewise, a typical accumulator for controlling such gaming machines might be the controller manufactured by Mikohn, Inc. under model No. Con II or Super Controller Model A.

In accordance with the principles of the present invention, the progressive jackpot gaming system of FIG. 1 is further adapted to provide for enhanced security and auditing features as well as enhanced operation and flexibility. More particularly, the accumulator 3 is further provided with a real time clock 3G which enables the accumulator, via its functional elements, i.e., the CPU 3A, programming 3B, data storage 3C, etc., to develop a jackpot history table for auditing purposes.

More particularly, as jackpot information is received by accumulator 3 from the gaming machines 2 indicating a jackpot-win for a given jackpot group at a given machine, the accumulator 3 causes the time clock 3G to be read to provide a time and date stamp for the jackpot-win. This data, along with the jackpot group, the jackpot amount (which the accumulator now holds in the jackpot stack 3F, as above-described,) and the machine 2 identification are then assembled and stored together in data storage 3C by the accumulator to form a jackpot history table 21 as shown in FIG. 2.

As can be appreciated, the jackpot history table 21 provides sufficient history for the jackpot-wins to be able to track and verify them. The table thus provides an auditing capability to settle disputes and clarify errors. The jackpot history table 21 can be accessed from the data storage 3C through appropriate access queries made, via the communication port 3E, by the accessing device 8.

In further accord with the invention, the accumulator 3 functional elements are additionally adapted so that access to the programming 3B and data 3C (which together establish the jackpot values), through the communication port 3E is monitored and controlled so as to provide security for the accumulator. In particular, this adaptation is such that the accumulator 3 is able to record the identification of both devices and device messages coupled to the communication port 3E and accessing the accumulator.

Specifically, the accumulator is configured to only respond to certain messages if they are accompanied or preceded by appropriate device and message type identifications. These identifications identify the device (e.g., the program or EPROM of the device) and the type of message (e.g. jackpot message) which can then be recorded and stored in the data storage 3C to form an accumulator history table. As shown in FIG. 3, this table also includes the time and date of the message, the latter being provided by real time clock 3G when the message is received.

The particular messages which require device and message type identifications before being accepted by the accumulator 3 depend upon the level of security desired for the accumulator. Thus, for example, messages which require a change in the accumulator programming configuration or a change in the accumulator data for jackpot determination (e.g., the jackpot base amounts and increment data) would be highly sensitive. Accordingly, these messages require device and message type identification, which can then be entered into the accumulator history table 31. Other types of messages, such as messages merely accessing the jackpot history table or other data for information purposes, rather than for the purpose of changing the data are less sensitive, and might not require identification information before being processed by the accumulator.

In order to add flexibility to the multiple jackpot gaming system 1 in the setting of the jackpot values JA and JB, the functional elements of the machines 2 and accumulator 3 are further configured to permit the coins-in of the machines to be allocated to different jackpot groups and to different increment rates for a particular jackpot group. FIG. 4 shows an illustrative allocation schedule effected between the devices 2 and the accumulator 3 for a game cycle and sequence of coins.

As shown, for the first through third coins-in, each progressive jackpot JA and JB is incremented and at its regular increment rate x, y, respectively. With the fourth coin, both groups are also incremented. However, in this case, the jackpot group JA increment has been changed to x′, while the increment for group JB remains at y. In the case of the fifth and sixth coins, the jackpot JA is no longer incremented. The jackpot B continues to be incremented, with the fifth coin at its regular rate y and with the sixth coin at a new rate y′.

Implementation of the above in the machines 2 and accumulator 3 can be through a variety of practices. Thus, for example, if the links carrying coins-in and jackpot-win information between the communication ports 2D and 3D of the accumulator and a gaming devices are multilines carrying multiplexed information, a different line can be associated with a different progressive jackpot group, e.g., line one with progressive group A and line two with progressive group B. Furthermore, the coins-in information on a line can be configured to indicate whether a particular coin is to be counted for that particular group and, if it is be counted at what increment rate (e.g., no pulse on a line—indicates coin not counted; one pulse on a line—indicates coin counted at first increment; two pulses on a line—indicates coin counted at second increment). Thus, the machine 2 will pulse its lines accordingly.

The accumulator 3, in turn, will recognize, the different lines as associated with the different jackpot group. Furthermore, it will recognize from the absence of a pulse and/or the number of pulses on a line, whether the jackpot for the associated group is to be incremented and at what rate.

Alternatively, as can be appreciated, if the links 4 and 7 carry packetized information, each individual packet itself can have assigned data bits identifying the jackpot group, the coins-in to be applied to each group and the increments to be applied for each coin-in. This information would be assembled into packet form at the respective machine 2 and disassembled and read at the accumulator 3 which would increment the jackpots values JA and JB accordingly.

As above-mentioned, the accumulator 3 is provided with a jackpot stack 3F which stores jackpot-wins, allowing the accumulator 3 to continue operation with the machines 2 which are still playing, while the machines at which the wins occurred are cleared. In accord with the invention, the jackpot stack 3F is further adapted so that it is less prone to lock-up the machines 2. Lock-up occurs when the stack 3F, whose positions are filled from the stack bottom and moved upward as new jackpot-wins are entered, becomes full and cannot accept new wins, thereby necessitating that the accumulator 3 lock the machines 2 until additional positions become available in the stack.

More particularly, this is accomplished by adapting the functional elements of the accumulator 3 such that upon the accumulator receiving information from a machine 2 (e.g., via a key switch signal or coin-in signal) that its jackpot has been cleared (i.e., paid and the machine reset), the accumulator immediately clears the position in the stack 3F associated with the cleared machine. Upon clearing this position, the stack is then caused to be scanned beginning with the newest jackpot entry position for vacant positions and then reshuffled by moving all stack positions upward to fill these positions.

FIG. 5A shows the jackpot stack 3E with representative entries for jackpot-wins. Assume, now that signals indicating that the jackpots at machines 106 and 111 are received in the accumulator 3 indicating that the jackpots at these machines have been cleared. The accumulator then clears the associated stack positions, as shown in FIG. 5B. The accumulator 3 then searches for cleared positions in the stack, starting from the newest entry (entry for machine 103), and reshuffles the stack to fill the empty positions, as shown in FIG. 5C.

With the operation of the stack 3F, as above-described, the stack positions become available for new entries immediately upon a machine 2 indicating it has been cleared. The stack thus becomes filled less frequently and lock-up of the system minimized.

The accumulator 3 of the invention is further adapted such that the programming 3B accomplishes its progressive jackpot calculations and manipulations to determine the jackpot values JPA and JPB during processes called from the main loop of the programming, which are non-interrupt based routines. This shortens the amount of time of interrupt mode processing and allows the main loop processing to proceed more quickly.

More particularly, when coin-in or jackpot-in information has been detected by a 'SCAN' timer interrupt routine of the accumulator 3, it will post the occurrence in one of two accumulator buffers; 1.) _COINS or 2.) _EVENTS. The 'x/y' coordinates of both buffers are the machine 2 identification and the information type (e.g., jackpot-win or coins-in which can be identified by input line). The SCAN routing also sets a flag called ACTIVE to alert the control loop of the programming 3B of the new condition.

The _COINS buffer is for storing coins-in information. The _EVENTS is used for jackpot-win information.

When the control loop detects the need to poll its _COINS and _EVENTS buffers, it calls the necessary routines. These routines always disable interrupts when the values in the _COINS and _EVENTS buffers (or the flag—ACTIVE) are modified. Interrupts are re-enabled after the byte is modified.

Using the control loop for jackpot processing, in addition to providing additional time for main-loop processing, also permits the watchdog output from the processor to be very regular. The scanning for coins-in and jackpot information can also be more regular.

The accompanying Microfiche Appendix shows representative flow charts for programming to accomplish the accumulator functions discussed above. These flow charts can be correlated to the above description as follows.

| Appendix | Title | Pages |
|---|---|---|
| A | C210 | 17, 18 |
| B | Heart B0 | 17, 18 |
| C | Heart B1 | 17, 18 |
| D | CJP0 | 14-16 |
| E | CJP1 | 14-16 |
| F | RCV3-0 | 14-16 |
| G | RCV3-1 | 14-16 |
| H | CJP-4 | 14-16 |
| I | CJP-3 | 16, 17 |
| J | XMT1-0 | 12, 13 |
| K | XMT1-1 | 12, 13 |
| L | XMT1-2 | 12, 13 |
| M | XMT1-3 | 12, 13 |

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A progressive accumulator for use in a progressive jackpot gaming system in which a plurality of gaming machines are adapted to receive coins-in and to have one or more jackpot groups whose respective jackpot values are determined based upon the coins-in and the jackpot-wins at the gaming machines, said gaming machines developing coins-in information including information related to each coin-in and jackpot-win information including information related to each jackpot-win and being adapted to make said coins-in information and said jackpot-win information available to the accumulator; the accumulator comprising:

a real time clock;

means responsive to said real time clock: for receiving said coins-in and jackpot-win information from said gaming machines; for electronically tagging each jackpot-win in said jackpot-win information with a time and date of receipt; and for establishing jackpot values for said gaming machines based on said coins-in information and said jackpot-win information;

means for storing each said electronically tagged jackpot-win;

and means for enabling said established jackpot values to be made available for supply to said gaming machines.

2. A progressive accumulator in accordance with claim 1 wherein:

said jackpot-win information includes for each jackpot-win in said jackpot-win information identification of the jackpot group won;

and said means for storing stores the jackpot value corresponding to each stored electronically tagged jackpot-win.

3. A progressive accumulator in accordance with claim 2 wherein:

said jackpot-win information includes identification of the gaming machine at which the win occurred.

4. A progressive accumulator for use in a progressive jackpot gaming system in which a plurality of gaming machines are adapted to receive coins-in and to have one or more jackpot groups whose respective jackpot values are determined based upon the coins-in and the jackpot-wins at the gaming machines, said gaming machines developing coins-in information including information related to each coin-in and jackpot-win information including information related to each jackpot-win and being adapted to make said coins-in information and said jackpot-win information available to the accumulator; the accumulator comprising:

first means for: receiving the jackpot-win information and the coins-in information developed by the gaming machines; for developing jackpot values for said jackpot groups based on said coins-in information and said jackpot-win information; said first means including programming means containing a program for operating said first means and data storage means;

second means adapted to connect to an external device which is other than a gaming machine for allowing the external device to transmit messages to said first means for accessing said first means for preselected purposes;

said first means responding to a message for accessing said first means for a particular preselected purpose only if the message contains one or more of a device identification and a message identification;

and third means enabling said established jackpot values to be made available for supply to said gaming machines.

5. An accumulator in accordance with claim 4 wherein:

said first means in response to a message stores in said storage means the device identification and message type identification contained in that message.

6. An accumulator in accordance with claim 5 wherein:

said data storage means stores jackpot data for use by said first means in developing said jackpot values;

and said first means responds to messages for accessing said first means for the purpose of gaining access to said jackpot data in said storage means and for the purpose of gaining access to said program of said programming means only if the messages contain both a device identification and a message identification.

7. A progressive accumulator for use in a progressive jackpot gaming system in which a plurality of gaming machines are adapted to receive coins-in and to have a plurality of jackpot groups whose respective jackpot values are determined based upon the coins-in and the jackpot-wins at the gaming machines, said gaming machines developing coins-in information including information related to each coin-in and jackpot-win information including information related to each jackpot-win and being adapted to make said coins-in information and said jackpot-win information available to the accumulator; the accumulator comprising:

means for receiving said coins-in information and said jackpot-win information;

means responsive to said receiving means: for allocating the jackpot-win information to said jackpot groups; for permitting, but not requiring, allocation of the information in the coins-in information related to a particular coin-in to more than one but less than all of the jackpot groups; and for establishing a jackpot value for each particular jackpot group based upon the coins-in information and jackpot-win information allocated to that particular jackpot group;

and means enabling said established jackpot values to be made available for supply to said gaming machines.

8. An accumulator in accordance with claim 7 wherein:

said means responsive to said receiving means establishes a jackpot value for each particular jackpot group by summing a base jackpot amount with a further jackpot amount which is based upon each coin-in indicated by the information related to each coin-in contained in the coins-in information allocated to the particular jackpot group.

9. An accumulator in accordance with claim 8 wherein:

said further jackpot amount for each particular jackpot group is determined by summing increment jackpot amounts determined for the indicated coins-in for that particular jackpot group.

10. An accumulator in accordance with claim 9 wherein:

said means responsive to said receiving means: determines from the information related to each coin-in contained in the coins-in information allocated to a particular jackpot group which one of a plurality of increment jackpot amounts is to be used for each indicated coin-in whose increment jackpot amount is to be summed to form said further jackpot amount for that particular jackpot group; and sums said determined increment jackpot amounts for the particular jackpot group to form the further jackpot amount for the particular jackpot group.

11. A progressive accumulator for use in a progressive jackpot gaming system in which a plurality of gaming machines are adapted to receive coins-in and to have one or more jackpot groups whose respective jackpot values are determined based upon the coins-in and the jackpot-wins at the gaming machines, said gaming machines developing coins-in information including information related to each coin-in and jackpot-win information including information related to each jackpot-win and being adapted to make said coins-in information and said jackpot-win information available to the accumulator, the accumulator comprising:

means for receiving coins-in information and jackpot-win information;

and means responsive to said receiving means: for allocating the jackpot-win information and the coins-in information to the jackpot groups; for establishing a jackpot value for a particular jackpot group based upon the information related to each coin-in in the coins-in information and the jackpot-win information allocated to that particular group, said establishing including the capability of establishing at one of a plurality of levels the contribution of a particular coin-in to a particular jackpot value depending upon the information in said coins-in information related to the particular coin-in;

and means for enabling said established jackpot values to be made available for supply to said gaming machines.

12. An accumulator in accordance with claim 11 wherein:

each said level is a different increment jackpot amount;

and said means responsive to said receiving means establishes each particular jackpot value by summing with a base jackpot amount the increment jackpot amounts for the coins-in indicated in the information in said coins-in information allocated to a particular jackpot group.

13. A progressive accumulator for use in a progressive jackpot gaming system in which a plurality of gaming machines are adapted to receive coins-in and to have one or more jackpot groups whose respective jackpot values are determined based upon the coins-in and the jackpot-wins at the gaming machines, said gaming machines developing coins-in information including information related to each coin-in and jackpot-win information including information related to each jackpot-win and being adapted to make said coins-in information and said jackpot-win information available to the accumulator, the accumulator comprising:

means for receiving coins-in information and jackpot-win information from said gaming devices, means responsive to said receiving means for establishing jackpot values for said jackpot groups based upon the coins-in information and jackpot-win information;

means for enabling said established jackpot values to be made available for supply to said gaming machines;

a memory stack having a plurality of positions each for storing the information in said jackpot-win information related to one jackpot-win;

and means for clearing from said stack the information related to a jackpot-win immediately and regardless of the position in said memory stack in which said information is stored, upon receipt from the gaming machine at which the jackpot-win has occurred of a signal indicating that the jackpot-win has been cleared and for reshuffling the stack to compress the information related to other jackpot-wins in the stack and thus eliminate isolated empty stack positions.

14. A progressive accumulator in accordance with claim 13 further comprising:

means for transmitting the jackpot values established by said establishing means to said gaming machines;

and means for inhibiting said transmitting means from transmitting to a gaming machine where a jackpot-win has occurred the jackpot value of the jackpot group of the won jackpot until the information related to the jackpot-win stored in said stack has been cleared from said stack.

15. A progressive jackpot gaming system comprising:

a plurality of gaming machines adapted to receive coins-in and one or more having jackpot groups whose respective jackpot values are determined based upon the coins-in and the jackpot-wins at the gaming machines, said gaming machines developing coins-in information including information related to each coin-in and jackpot-win information including information related to each jackpot-win and being adapted to make said coins-in information and said jackpot-win information available to a progressive accumulator;

and a progressive accumulator responsive to said gaming machines for determining said jackpot values comprising: a real time clock; means responsive to said real time clock: for receiving said coins-in and jackpot-win information from said gaming machines; for electronically tagging each jackpot-win in said jackpot-win information with a time and date of receipt; and for establishing jackpot values for said gaming machines based on said coins-in information and said jackpot-win information; means for storing each said electronically tagged jackpot-win; and means for enabling said established jackpot values to be made available for supply to said gaming machines.

16. A system in accordance with claim 15 wherein:

said jackpot-win information includes for each jackpot-win in said jackpot win information identification of the jackpot group won and identification of the gaming machine at which the win occurred;

and said means for storing stores the jackpot value corresponding to each stored electronically tagged jackpot-win information.

17. A progressive jackpot gaming system comprising:

a plurality of gaming machines adapted to receive coins-in and one or more having jackpot groups whose respective jackpot values are determined based upon the coins-in and the jackpot-wins at the gaming machines, said gaming machines developing coins-in information including information related to each coin-in and jackpot-win information including information related to each jackpot-win and being adapted to make said coins-in information and said jackpot-win information available to a progressive accumulator;

and a progressive accumulator responsive to said gaming machines for developing said jackpot values comprising: first means for: receiving the jackpot-win information and the coins-in information developed by the gaming machines; for developing jackpot values for said jackpot groups based on said coins-in information and said jackpot-win information; said first means including programming means containing a program for operating said first means and data storage means; second means adapted to connect to an external device which is other than a gaming machine for allowing the external device to transmit messages to said first means for accessing said first means for preselected purposes; said first means responding to a message for accessing said first means for a particular preselected purpose only if the message contains one or more of a device identification and a message identification; and third means enabling said established jackpot values to be made available for supply to said gaming machines.

18. A system in accordance with claim 17 wherein: said first means in response to a message stores in said storage means the device identification and message type identification contained in that message.

19. A system in accordance with claim 18 wherein: said data storage means stores jackpot data for use by said first means in developing said jackpot values; and said first means responds to messages for accessing said first means for the purpose of gaining access to jackpot data in said storage means and for the purpose of gaining access to said program of said programming means only if the messages contain both a device identification and a message identification.

20. A progressive jackpot gaming system comprising: a plurality of gaming machines adapted to receive coins-in and one or more having a plurality of jackpot groups whose respective jackpot values are determined based upon the coins-in and the jackpot-wins at the gaming machines, said gaming machines developing coins-in information including information related to each coin-in and jackpot-win information including information related to each jackpot-win and being adapted to make said coins-in information and said jackpot-win information available to a progressive accumulator;

and a progressive accumulator responsive to said gaming machines for developing said jackpot values comprising: means for receiving said coins-in information and said jackpot-win information; means responsive to said receiving means: for allocating the jackpot win information to said jackpot groups; for permitting, but not requiring, allocation of the information in the coins-in information related to a particular coin-in to more than one but less than all of the jackpot groups; and for establishing a jackpot value for each particular jackpot group based upon the coins-in information and jackpot-win information allocated to that particular jackpot group; and means enabling said established jackpot values to be made available for supply to said gaming machines.

21. A system in accordance with claim 20 wherein: said means responsive to said receiving means establishes a jackpot value for each particular jackpot group by summing a base jackpot amount with a further jackpot amount which is based upon each coin-in indicated by the information related to each coin-in contained in the coins-in information allocated to the particular jackpot group.

22. A system in accordance with claim 21 wherein: said further jackpot amount for each particular jackpot group is determined by summing increment jackpot amounts determined for the indicated coins-in for that particular jackpot group.

23. A system in accordance with claim 22 wherein: said means responsive to said receiving means: determines from the information related to each coin-in contained in the coins-in information allocated to a particular jackpot group which one of a plurality of increment jackpot amounts is to be used for each indicated coin-in whose increment jackpot amount is to be summed to form said further jackpot amount for that particular jackpot group; and sums said determined increment jackpot amounts for the particular jackpot group to form the further jackpot amount for the particular jackpot group.

24. A progressive jackpot gaming system comprising: a plurality of gaming machines adapted to receive coins-in and having one or more jackpot groups whose respective jackpot values are determined based upon the coins-in and the jackpot-wins at the gaming machines, said gaming machines developing coins-in information including information related to each coin-in and jackpot-win information including information related to each jackpot-win and being adapted to make said coins-in information and said jackpot-win information available to a progressive accumulator;

and a progressive accumulator responsive to said gaming machines for developing said jackpot values comprising: means for receiving coins-in information and jackpot-win information; means responsive to said receiving means: for allocating the jackpot win information and the coins-in information to the jackpot groups; for establishing a jackpot value for a particular jackpot group based upon the information related to each coin-in in the coins-in information and the jackpot-win information allocated to that particular group, said establishing including the capability of establishing at one of a plurality of levels the contribution of a particular coin-in to a particular jackpot value depending upon the information in said coins-in information related to the particular coin-in; and means for enabling said established jackpot values to be made available for supply to said gaming machines.

25. A system in accordance with claim 24 wherein: each said level is a different increment jackpot amount;

and said means responsive to said receiving means establishes each particular jackpot value by summing with a base jackpot amount the increment jackpot amounts for the coins-in indicated in the information in said coins-in information allocated to a particular jackpot group.

26. A progressive jackpot gaming system comprising: a plurality of gaming machines adapted to receive coins-in and having one or more jackpot groups whose respective jackpot values are determined based upon the coins-in and the jackpot-wins at the gaming machines, said gaming machines developing coins-in information including information related to each coin-in and jackpot-win information including information related to each jackpot-win and being adapted to make said coins-in information and said jackpot-win information available to a progressive accumulator;

and a progressive accumulator responsive to said gaming machines for developing said jackpot values comprising: means for receiving coins-in information and jackpot-win information from said gaming machines; means responsive to said receiving means for establishing jackpot values for said jackpot groups based upon the coins-in information and jackpot-win information; means for enabling said established jackpot values to be made available for supply to said gaming machines; a memory stack having a plurality of positions each for storing the information in said jackpot-win information related to one jackpot-win; and means for clearing from said stack the information related to a jackpot-win immediately and regardless of the position in said memory stack in which said information is stored, upon receipt from the gaming machine at which the jackpot-win has occurred of a signal indicating that the jackpot-win has been cleared and for reshuffling the stack to compress the information related to other jackpot-wins in the stack and thus eliminate isolated empty stack positions.

27. A system in accordance with claim 26 wherein:

said accumulator further comprises: means for transmitting the jackpot values established by said establishing means to said gaming machines; and means for inhibiting said transmitting means for transmitting to a gaming machine where a jackpot-win has occurred the jackpot value of the jackpot group of the won jackpot until the information related to the jackpot-win stored in said stack has been cleared from said stack.

28. A method for used in a progressive jackpot gaming system in which a plurality of gaming machines are adapted to receive coins-in and to have one or more jackpot groups whose respective jackpot values are determined based upon the coins-in and the jackpot-wins at the gaming machines, said gaming machines developing coins-in information including information related to each coin-in and jackpot-win information including information related to each jackpot-win and being adapted to make said coins-in information and said jackpot-win information available; the method comprising:

receiving from said gaming machines said coins-in and jackpot win information;

developing said jackpot values for said gaming machines using said received coins-in information and jackpot-win information;

electronically tagging each jackpot-win in said received jackpot-win information from the gaming machines with a time and date of receipt;

storing each said electronically tagged jackpot-win;

and enabling said developed jackpot values to be made available to said gaming machines.

29. The method in accordance with claim 28 wherein:

said jackpot-win information includes for each jackpot-win in said jackpot-win information identification of the jackpot group won and identification of the gaming machine at which the win occurred;

and said storing step further includes storing the jackpot value corresponding to each stored electronically tagged jackpot-win.

30. A method for use in a progressive jackpot gaming system in which a plurality of gaming machines are adapted to receive coins-in and to have one or more jackpot groups whose respective jackpot values are determined based upon the coins-in and the jackpot-wins at the gaming machines, said gaming machines developing coins-in information including information related to each coin-in and jackpot-win information including information related to each jackpot-win and being adapted to make said coins-in information and said jackpot-win information available the method comprising:

receiving from said gaming machines said coins-in and jackpot-win information;

using programming means containing programs for operating a first means and using data storage means contained in said first means, developing with said first means said jackpot values for said jackpot groups from said received jackpot-win information and coins-in information;

allowing an external device which is other than a gaming machine to transmit messages to said first means for accessing said first means for preselected purposes;

permitting said first means to respond to a message for accessing said first means for a particular preselected purpose only if the message contains one or more of a device identification and a message identification;

and enabling said developed jackpot values to be made available to said gaming machines.

31. A method in accordance with claim 30 wherein:

said permitting step includes storing the device identification and message identification contained in a message.

32. An method in accordance with claim 31 wherein:

said data storage means stores jackpot data for use in said developing step;

and said permitting step is carried out by permitting said first means to respond to messages for accessing said first means for the purpose of gaining access to said jackpot data in said storage means and for the purpose of gaining access to said program of said programming means only if the messages contain both device identification and a message identification.

33. A method for use in a progressive jackpot gaming system in which a plurality of gaming machines are adapted to receive coins-in and to have a plurality of jackpot groups whose respective jackpot values are determined based upon the coins-in and the jackpot-wins at the gaming machines, said gaming machines developing coins-in information including information related to each coin-in and jackpot-win information including information related to each jackpot-win and being adapted to make said coins-in information and said jackpot-win information available, said method comprising:

receiving said coins-in information and said jackpot-win information;

allocating the jackpot-win information to said jackpot groups;

permitting, but not requiring, allocation of the information in the coins-in information related to a particular coin-in to more than one but less than all of the jackpot groups;

establishing a jackpot value for each particular jackpot group based upon the coins-in information and jackpot-win information allocated to that particular jackpot group;

and enabling said established jackpot values to be made available to said gaming machines..

34. A method in accordance with claim 33 wherein:

said step of establishing a jackpot value for each particular jackpot group is carried out by summing a base jackpot amount with a further jackpot amount which is based upon each coin-in indicated by the information related to each coin-in contained in the coins-in information allocated to the particular jackpot group.

35. A method in accordance with claim 34 wherein: said further jackpot amount for each particular jackpot group is determined by summing increment jackpot amounts determined for the indicated coins-in for that particular jackpot group.

36. A method in accordance with claim 35 wherein: said establishing step includes: determining from the information related to each coin-in contained in the coins-in information allocated to a particular jackpot group which one of a plurality of increment jackpot amounts is to be used for each indicated coin-in whose increment jackpot amount is to be summed to form said further jackpot amount for that particular jackpot group; and summing said determined increment jackpot amounts for the particular jackpot group to form the further jackpot amount for the particular group.

37. A method for use in a progressive jackpot gaming system in which a plurality of gaming machines are adapted to receive coins-in and to have one or more jackpot groups whose respective jackpot values are determined based upon the coins-in and the jackpot-wins at the gaming machines, said gaming machines developing coins-in information including information related to each coin-in and jackpot-win information including information related to each jackpot-win and being adapted to make said coins-in information and said jackpot-win information available, said method comprising:

receiving coins-in information and jackpot-win information;

allocating the jackpot-win information and the coins-in information to the jackpot groups;

establishing a jackpot value for a particular jackpot group based upon the information related to each coin-in in the coins-in information and the jackpot-win information allocated to that particular group, said establishing including the capability of further establishing at one of a plurality of levels the contribution of a particular coin-in to a particular jackpot value depending upon the information in said coins-in information related to the particular coin-in;

and enabling said established jackpot values to be made available for supply to said gaming machines.

38. A method in accordance with claim 37 wherein:

each said level is a different increment jackpot amount;

said establishing step includes determining each particular jackpot value by summing with a base jackpot amount the increment jackpot amounts for the coins-in indicated in the information in said coins-in information allocated to a particular jackpot group.

39. A method for use in a progressive jackpot gaming system in which a plurality of gaming machines are adapted to receive coins-in and to have one or more jackpot groups whose respective jackpot values are determined based upon the coins-in and the jackpot-wins at the gaming machines, said gaming machines developing coins-in information including information related to each coin-in and jackpot-win information including information related to each jackpot-win and being adapted to make said coins-in information and said jackpot-win information available, said the method comprising:

receiving coins-in information and jackpot-win information from said gaming devices, establishing jackpot values for said jackpot groups based upon the coins-in information and jackpot-win information;

enabling said established jackpot values to be made available to said gaming machines;

providing a memory stack having a plurality of positions each for storing the information in said jackpot-win information related to one jackpot-win;

and clearing from said stack the information related to a jackpot-win immediately and regardless of the position in said memory stack at which said information is stored, upon receipt from the gaming machine at which the jackpot-win has occurred of a signal indicating that the jackpot has been cleared and reshuffling the stack to compress the information related to the jackpot-wins in the stack and thus eliminate isolated empty stack positions.

40. A method in accordance with claim 35 further comprising:

transmitting the established jackpot values to said gaming machines;

and inhibiting said transmitting to a gaming machine where a jackpot-win has occurred the established jackpot value of the jackpot group of the won jackpot until the information related to the jackpot-win has been cleared from said stack.

* * * * *

UNITED STATES PATENT AND TRADEMARK OFFICE
CERTIFICATE OF CORRECTION

PATENT NO. : 5,344,144

DATED : September 6, 1994

INVENTOR(S) : Joseph W. Canon

It is certified that error appears in the above-identified patent and that said Letters Patent is hereby corrected as shown below:

Col. 1, line 55. Change "lead" to -- led --.

Col. 5, line 45. Change "I6T" to -- IGT --.

Col. 7, line 5. Delete "a".

Col. 18, line 21. Delete "the".

Col. 18, line 43, Change "35" to -- 39 --.

Signed and Sealed this

Twenty-fourth Day of January, 1995

*Attest:*

Bruce Lehman

BRUCE LEHMAN

*Attesting Officer*

*Commissioner of Patents and Trademarks*

US005344144C1

(12) EX PARTE REEXAMINATION CERTIFICATE (5927th)

United States Patent

Canon

(10) Number: US 5,344,144 C1

(45) Certificate Issued: Oct. 9, 2007

(54) PROGRESSIVE JACKPOT GAMING SYSTEM WITH ENHANCED ACCUMULATOR

(75) Inventor: Joseph W. Canon, Las Vegas, NV (US)

(73) Assignee: Mikohn Gaming Corporation, Las Vegas, NV (US)

Reexamination Request:
No. 90/008,274, Jan. 3, 2007

Reexamination Certificate for:

| | |
|---|---|
| Patent No.: | **5,344,144** |
| Issued: | **Sep. 6, 1994** |
| Appl. No.: | **07/589,428** |
| Filed: | **Sep. 27, 1990** |

Certificate of Correction issued Jan. 24, 1995.

(51) Int. Cl.

| | |
|---|---|
| *A63F 3/08* | (2006.01) |
| *A63F 3/00* | (2006.01) |
| *A63F 9/24* | (2006.01) |
| *G07F 17/32* | (2006.01) |
| *G07F 17/34* | (2006.01) |

(52) U.S. Cl. ........................ 463/27; 463/42; 273/143 R

(58) Field of Classification Search ....................... None
See application file for complete search history.

(56) References Cited

U.S. PATENT DOCUMENTS 4,964,638 A 10/1990 Ishida

FOREIGN PATENT DOCUMENTS

WO WO 80/02512 11/1980

OTHER PUBLICATIONS

International Game Technology, Internal Audit Department, System of Internal Control for Wide Area Progressive System (Nov. 1, 1985) with attached cover letter of Walt Hawkins, dated Nov. 18, 1985.

*Primary Examiner*—Michael O'Neill

(57) ABSTRACT

An accumulator for a multiple jackpot gaming system wherein the accumulator has the facility for date stamping jackpot-wins, recording the identification of devices and changes being made by such devices to its data and/or programming, allocating coins-in to one or more jackpot groups and/or to one or more increment rates assigned to a particular jackpot group, operate its jackpot stack so as to clear stack positions immediately upon clearing a jackpot, and control jackpot handling from its main programming loop.

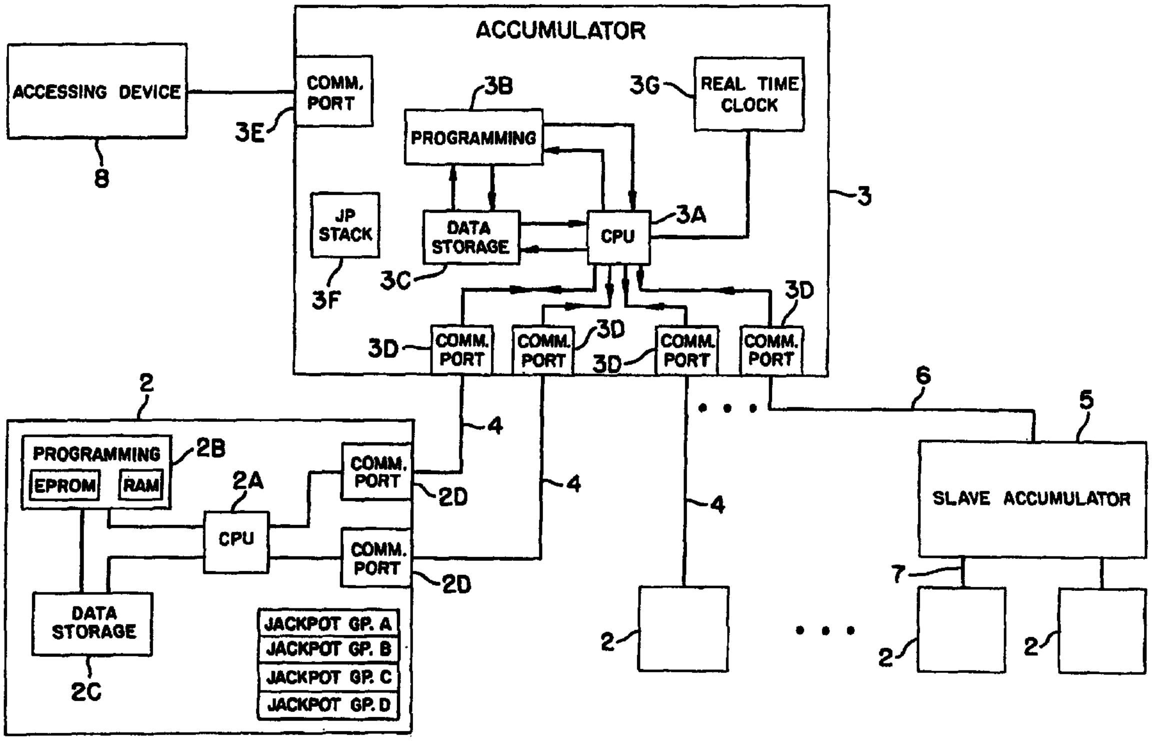

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–40 is confirmed.

* * * * *